United States Patent [19]

Hayek

[11] Patent Number: 5,197,577
[45] Date of Patent: Mar. 30, 1993

[54] PARKING BRAKE LOCK FOR A GROUND-MOBILE IMPLEMENT

[75] Inventor: James S. Hayek, Racine, Wis.
[73] Assignee: Textron, Inc., Providence, R.I.
[21] Appl. No.: 729,597
[22] Filed: Jul. 15, 1991
[51] Int. Cl.⁵ .................. F16D 69/00; B60T 1/00
[52] U.S. Cl. .................. 188/265; 188/4 R; 56/11.3; 74/532
[58] Field of Search .......... 188/2 F, 4 R, 265; 56/11.3; 74/483 R, 503, 527, 529, 532; 192/11

[56] References Cited

U.S. PATENT DOCUMENTS

| | | | |
|---|---|---|---|
| 2,928,292 | 3/1960 | Hirst, Jr. | 74/503 |
| 3,710,904 | 1/1973 | Boyer et al. | 188/265 |
| 4,310,082 | 1/1982 | Elmy et al. | 192/11 |
| 4,503,958 | 3/1985 | Nishio | 56/11.3 |
| 4,558,558 | 12/1985 | Horner, Jr. et al. | 56/11.3 |
| 4,667,785 | 5/1987 | Toyoda et al. | 74/532 |
| 4,793,207 | 12/1988 | Old | 74/532 |
| 4,967,543 | 11/1990 | Scag et al. | 56/10.8 |

OTHER PUBLICATIONS

Jacobsen Operators Manual, Crew King, 1989, Textron, Inc.

Primary Examiner—Robert J. Oberleitner
Assistant Examiner—Chris Schwartz
Attorney, Agent, or Firm—Arthur J. Hansmann

[57] ABSTRACT

A ground-mobile implement parking brake lock which can be set to engaged and disengaged positions relative to the braking mechanism of the implement, along with setting the implement in the engaged or disengaged power drive mode for the ground wheels. This is done with three surfaces on a lock lever.

13 Claims, 4 Drawing Sheets

PARKING BRAKE LOCK FOR A GROUND-MOBILE IMPLEMENT

This invention relates to a parking brake lock for a ground-mobile implement, and, more particuarly it relates to a brake lock which secures the implement brake in a locked position when the implement is parked.

BACKGROUND OF THE INVENTION

The prior art includes mechanisms for actuating ground-implement brakes in various modes of operating conditions. For instance, where the implement is maneuvered over the ground by means of handlebars or hand grips, it is common to have a brake lever adjacent the hand grip for actuating the brake and thereby retard wheel rotation, as desired. However, in these instances, the prior art brakes are arranged so that the operator must continue to exert a hand-gripping pressure on the brake lever in order to actuate the brake. Accordingly, immediately upon releasing the brake lever, the brake itself is released by means of a spring force commonly applied to the brake and operative toward the released or non-braking position. That is, when the implement is unattended, it is free to roll or move over the ground because the brake is automatically released.

U.S. Pat. No. 4,558,558 shows one example of a prior art brake mechanism of the type mentioned above. In that arrangement, when the operator releases the brake lever, then the implement is free to roll or otherwise be maneuvered over the ground, and in the context of the present invention, that is undesirable. That is, the present invention provides for a parking brake lock which permits the operator to set the brake in a locked position and walk away from the implement which remains in the locked position and therefore cannot inadvertently roll over the ground.

U.S. Pat. No. 4,967,543 shows an arrangement of a control lever on the implement handlebar and wherein the lever can be set in multiple positions for the purpose of controlling the speed of the hydraulic motor driving the implement wheels. That is only a speed control lever arrangement, and it is not pertaining to a parking brake, even though the lever itself is mounted on the implement handlebar or adjacent the hand grip and can be maneuvered between different positions.

Beyond the aforementioned basic objective of this invention, the present invention also provides a parking brake lock which is operatively connected with the mechanism for placing the implement in a driving mode, such that the driving mode mechanism and the parking brake lock operate in unison, but with their respective and thus opposite effects of mobilizing the implement and securing the implement in an immobilized mode.

Still further, the present invention provides a parking brake lock which is combined with a wheel brake which can be set in various degrees of braking force operative on the wheels, and this permits the maneuverability of the implement by applying the wheel brake on one side of the implement, say the left side, and thereby have the implement move to the left side while the wheel on the right side is free to drive the implement in the left-turning direction.

Still further, the present invention provides a parking brake lock which is arranged for automatic compensation of wear of the various parts in the system, including the brake band and the like. Also, the arrangement is such that the system automatically accommodates the variability or interconnection of the various parts which comprise the system, such that the overall reach or length of the system from the actuating lever and down to the brake itself is automatically accommodated by virtue of this unique parking brake lock.

Still further, the parking brake lock of this invention provides for positioning the brake mechanism in an implement-running position as well as in the parking brake lock position, all incorporated into one lever. Still further, the one lever mentioned can be maneuvered either by the operator's thumb pressure adjacent the hand grip, or greater force and leverage can be applied to the lever by means of an additional lever arm incorporated in the lock member. In the ultimate, the single lock member provides for the function of locking the brake, and the function of holding the mechanism in a neutral position where there is no drive power applied to the wheels and there is no brake lock, and it provides for a third position where there is drive power to the wheels but again there is no brake lock. In the arrangement of these several positions, it is also a feature that if the brake lock is set in the lock position and the engine is running, if the lock is moved out of the lock position, inadvertently or intentionally, then the lock can normally go to a position which will still prevent the engine power from being transmitted to the driven wheels even though the system is in the non-parking brake mode. Further, the system is placed into the drive mode only by a specific maneuver of the parking brake lock, so that it cannot be acccidentally placed into the drive mode from the parking brake lock mode.

Other objects and advantages will become apparent upon reading the following description.

DETAILED DESCRIPTION OF THE PRIOR ART AND THE PREFERRED EMBODIMENT OF THIS INVENTION

Figure 3:
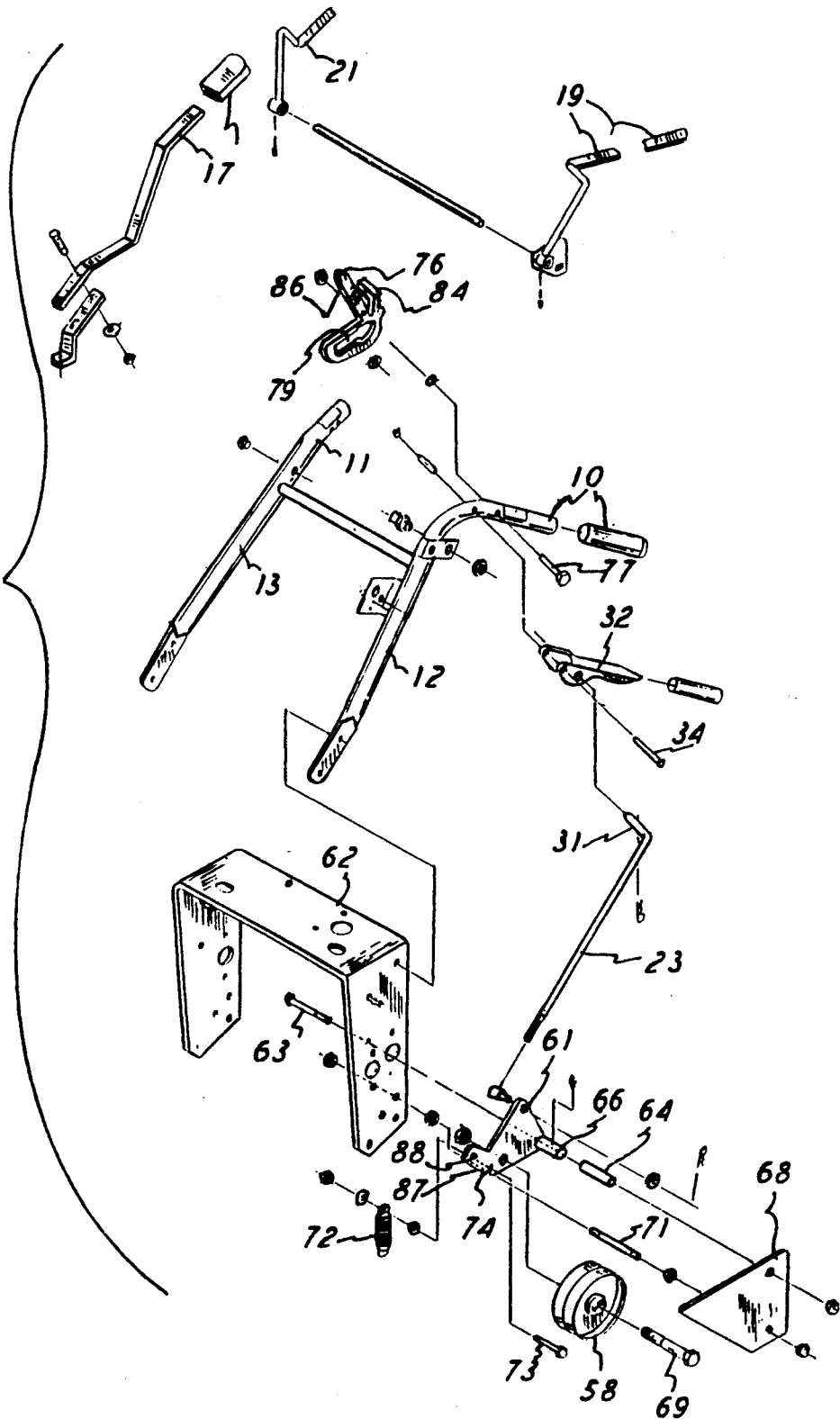
FIG. 3 is an exploded view of parts of the implement of this invention.
Figure 6:
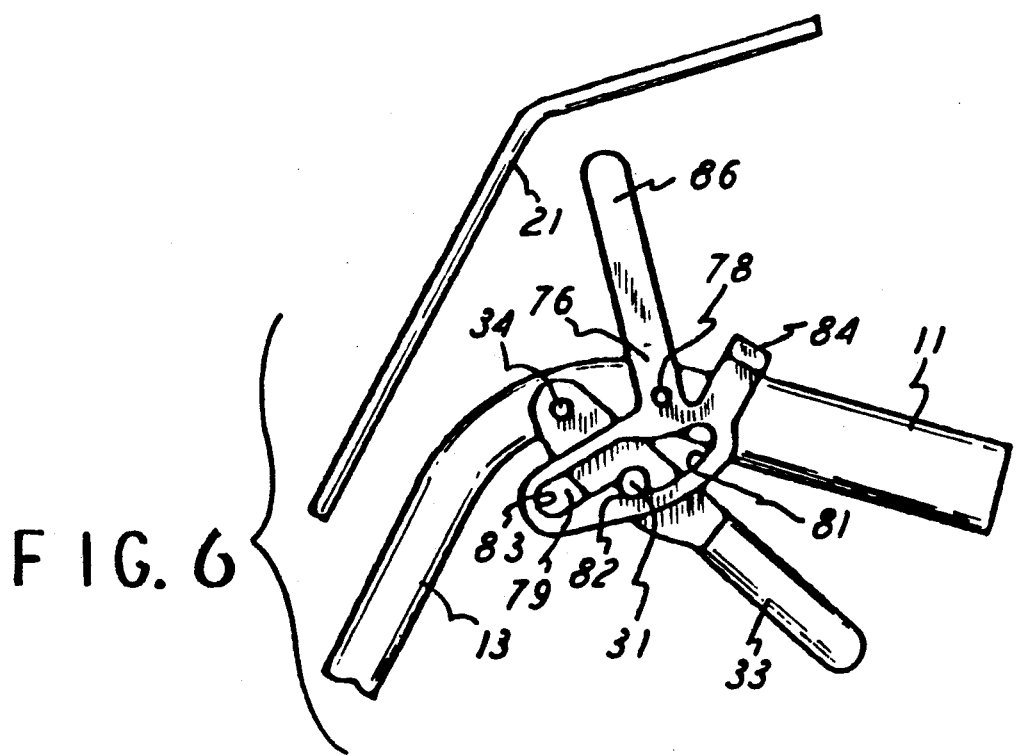
FIG. 6 is an enlarged side-elevational view of a hand-grip portion of this invention.

The drawings are showing parts of the ground-mobile and hand-manipulated implement of this invention, and it will be readily understood that the implement is a conventional type, such as a lawn mower, and it may be as fully shown in U.S. Pat. No. 4,967,543 to the extent that the patent shows a ground-mobile lawn mower with ground wheels and hand grips for maneuvering the implement. Except for the overall arrangement of the various parts shown in the drawings herein, all but FIG. 3 and 6 show a type of implement which is already in the prior art.

Figure 1:
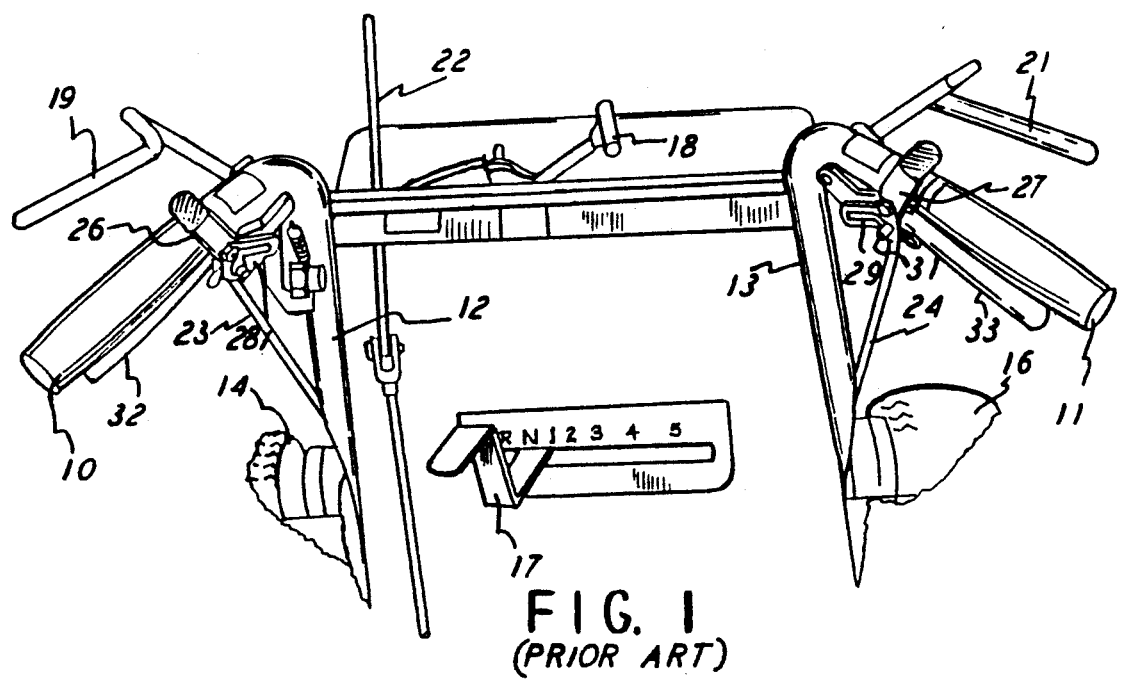
FIG. 1 is a rear perspective view of a fragment of a prior art ground-mobile implement of the type of this invention.

Accordingly, FIG. 1 shows the conventional implement with two hand grips 10 and 11 and with extending hand bars 12 and 13 through which the operator can manipulate the implement on the ground by virtue of the wheels 14 and 16 which are rotationally mounted as a part of the implement, all in a conventional arrangement. Also, there is a transmission shift lever 17 suitably mounted on the implement, and it establishes the various shifted positions of the transmission. An engine throttle control lever 18 and the two movable operator's presence control levers 19 and 21 are also mounted on the implement and will be manually depressed by the operator when gripping the grips 10 and 11 to thereby place the implement engine in the running mode. When the levers 19 and 21 are released, then the engine will automatically shut off, all in the conventional arrangement. Further, there is an implement control lever 22, and this may be a mowing blade engagement lever which the operator can position for placing the working mechanism of the implement in the engaged or disengaged position.

Finally, the conventional implement of the type being described, has control rods 23 and 24 extending from the area of the respective hand grips 10 and 11 and downwardly to operating mechanism of the implement, such as described later. The upper ends of each of the rods 23 and 24 connect with latches 26 and 27, respectively and these latches have slots 28 and 29 for engaging the rod ends 31 and thus holding the rods generally along their longitudinal axes for engagement of the power drive to the wheels 14 and 16 and also for the engagement and disengagement of the implement brakes to be described later. At this time it will be understood that the thumb-type latches 26 and 27, mounted pivotally on the hand grips 10 and 11, can be maneuvered by the operator to position the connectors' upper ends 31 in various locations in the slots 28 and 29 in the respective latches 26 and 27, for the purposes mentioned.

Figure 5:
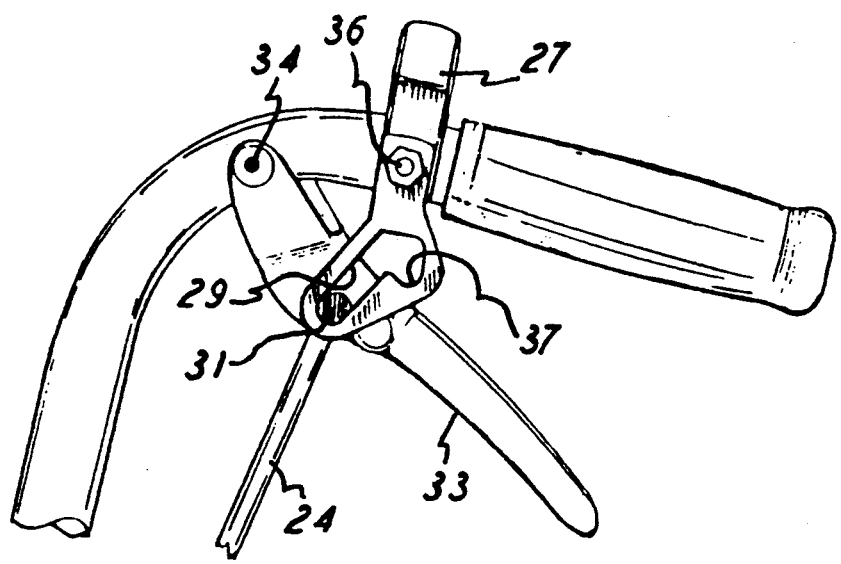
FIG. 5 is an enlarged side-elevational view of a hand-grip portion of a prior art implement.

To position the rods or connectors 23 and 24 in their aforementioned operative or inoperative positions, there is a hand lever 32 and 33 pivotally mounted on each hand grip 10 and 11, as best shown in FIG. 5. The levers 32 and 33 are pivotally mounted on the hand grips by pivot pins 34, and rod upper ends 31 extend through the levers 33 to thus have the rods 23 and 24 move generally along their longitudinal axes in response to the pivoted position of the levers 32 and 33. Also, as shown in FIG. 5, the rod ends 31 extend into the latch slots 28 and 29 and thus the latches 26 and 27 serve to hold the two rods 23 and 24 in positions determined by the pivoted positions of the latches 26 and 27 and by the configuration of the latch slots 28 and 29. Of course the latches 26 and 27 are pivotally mounted on the hand grips by means of pivot pins 36, as seen in FIG. 5.

In the position shown in FIG. 5, the rod 24 is in its lowermost position and is secured there by means of the latch 27 because the rod end 31 is in the bottom of the latch slot 29, and that is the position where the implement brake is not being applied, but the power to the drive wheels 14 and 16 is engaged when the transmission is in gear. Next, when the lever 33 is pivoted upwardly from the FIG. 5 position, that raises the rod end 31 to where the latch notch 37 can receive the rod end 31 and thus secure the rod 24 in the upward position, and that can be the position of non-engagement of the power drive to the wheel 16. However, when the rod end 31 is in the notch 37 in the latch 27, the brake to the implement is not engaged. Of course that means that the implement is not being driven, but it is free to be moved or free to roll downhill if left unattended. The left side of the implement is the same.

With further regard to FIG. 5, if the operator desires to apply the brake to either wheel 14 or 16, then he would squeeze the respective lever 32 or 33 to raise the respective rod 23 or 24 above the elevation identified by the notch 37, and that would apply the brake to that particular wheel 14 or 16. However, there is no mechanism by which the brakes would remain engaged without the operator squeezing the lever 32 or 33 upwardly toward the respective hand grip 10 or 11. Also, when the operator releases the levers 32 or 33, the brake is of a spring-loaded nature and will automatically move to the disengaged position which is then the time when the implement can be maneuvered over the ground or it can inadvertently roll downhill.

Figure 4:
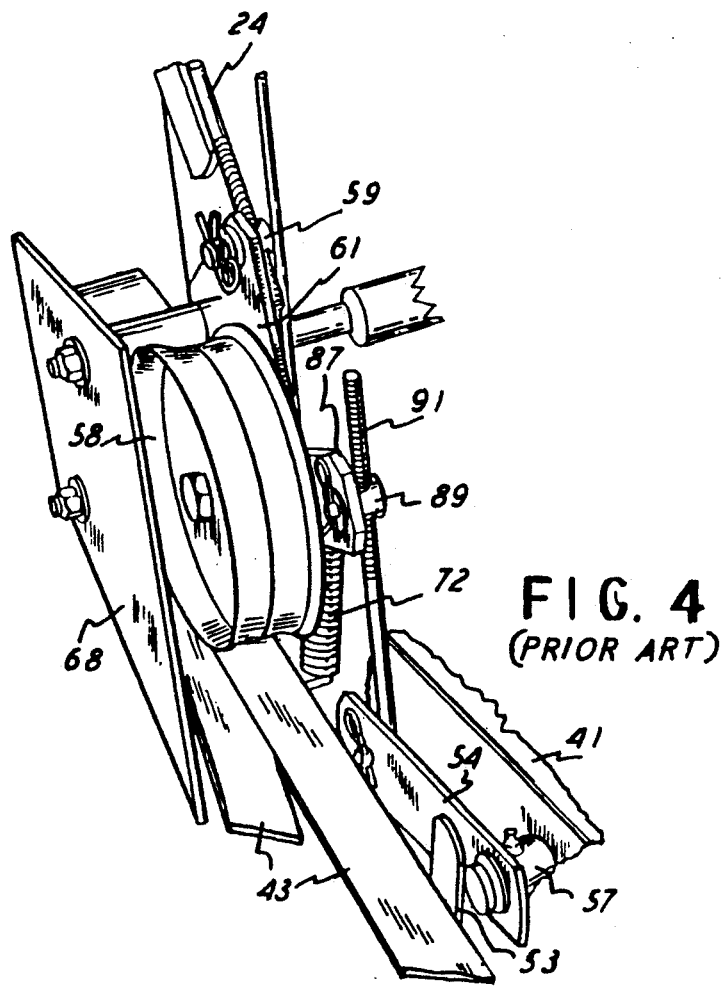
FIG. 4 is a perspective view of a fragment of a prior art implement incorporated into this invention.
Figure 2:
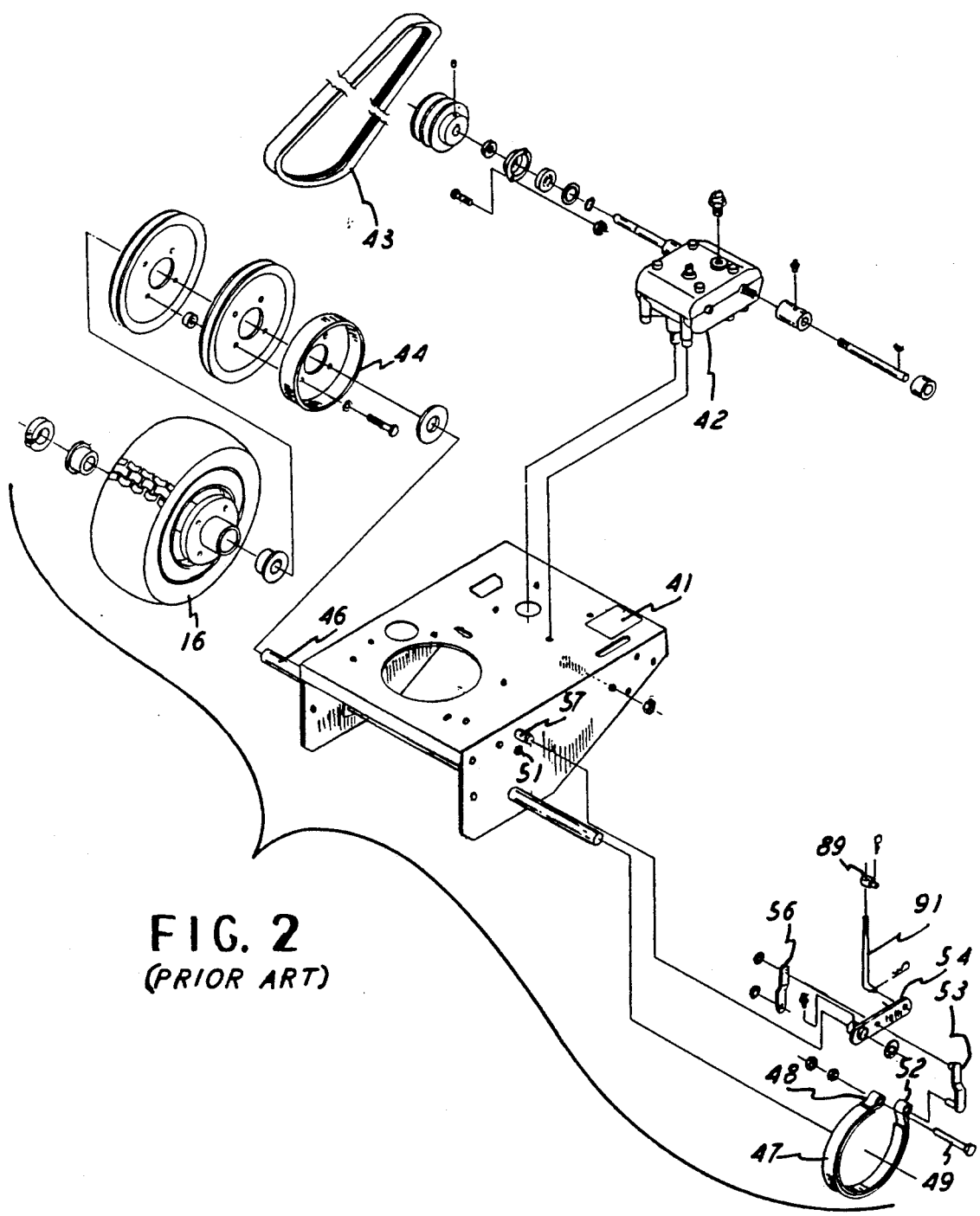
FIG. 2 is an exploded view of a prior art ground-mobile implement of the type of this invention.

FIGS. 2 and 4 further elaborate on this prior art and here it will be seen that the implement includes engine base 41 on which is mounted a transmission 42 and that in turn operates the belt 43 for driving the wheel 16 on the right side of the mower. The shown wheel assembly has a brake drum 44 included therein, and the entire assembly would be mounted on the axle 46 supported by the engine base 41. The lower right-hand corner of this descriptive exploded view depiction shows the wheel brake band 47 which is circularly shaped and of course is concentric with the brake drum 44 which would be on the unshown but left wheel 14 of the implement. In assembly, the brake band end 48 receives the screw 49 which mounts in the hole 51 in the side of the engine base 41. The brake band other end 52 attaches to a brake link 53, on one side of a brake link bar 54 and to a brake link 56, on the other side of the bar 54. Thus, the two brake band ends 48 and 52 are respectively connected and are controlled for squeezing the brake band toward the drum 44, in braking engagement, and for releasing the brake band relative to the drum 44 in the disengaged position.

The bar or linkage 54 is pivotally mounted on the shaft 57 on the engine base 41. Therefore, in a pivotal movement the bar 54 will be imposed on the link assemblies 53 and 56 to thereby tighten or loosen the band 47 relative to the brake drum 44 in the braking action. Of course it will be understood that each side of the implement is the same, in mirror image, and thus there is a brake assembly for each wheel 14 and 16 and therefore the operator can actually fully stop the implement by releasing the drive and applying both brakes, or he can steer the implement by applying only one brake and have the implement move toward that side.

FIG. 4 shows another view of the prior art parts described, and here it will be seen that the bar 54 is shown mounted on the engine base 41 and about the pivot mounting 57. Also, the link 53 is shown in its position of extending downwardly to the brake band 47, and the wheel drive belt 43 is shown and it will be understood that it is engaged with the idler pulley 58. Further, the connector or rod 24 is shown, and it pivotally connects through a swivel 59 to a plate 61.

FIG. 3 shows the implement handle bracket 62 to which the handles 12 and 13 are attached, and the bracket has the shown two depending legs which are adjacent the engine base 41. A control plate 61 is pivotally mounted on each side of the bracket 62, such as by the mounting screw 63 and the bushing 64 received within the sleeve 66 in the assembly. A plate 68 forms a side shield, and it is also seen in FIG. 4, and it is spaced from the bracket 62 by the double-ended threaded spacer 71, as indicated. The idler 58 is rotatably mounted on the plate 61 by means of the screw 69.

With that arrangement, the plate 61 can pivot up and down about the axis of the sleeve 66, and thus the idler 58 can be moved up and down relative to the drive belt 43 and thereby control the drive to the implement wheels 14 and 16. FIG. 3 therefore also shows that the connector 23 has its lower end connected to the plate 61 and has its upper end connected to the lever 32. An uprightly shown tension spring 72 has its upper end attached to the plate 61 through a pin 73 in a hole 74 in the plate 61. The lower end of the spring 72 is suitably anchored relative to the assembly, such as in a lower position on the bracket 62. The spring 72 is thereby arranged so that it pivots the plate 61 downwardly, or counter-clockwise as generally viewed in FIG. 3. Therefore, the spring 72 tends to hold the idler pulley 58 downwardly so that there is tension in the belt 43 in order to transmit the drive to the ground wheels, in the conventional arrangement. Of course FIG. 3 also shows that the connector 23 can be pulled upwardly, through the lever 32, and thus pivot the plate 61 in the clockwise direction to thus release the idler 58 from pressing on the drive belt 43 and thereby disengage the drive.

FIGS. 3 and 6 show the contribution of this invention in the assembly of the parts heretofore described and in conjunction with the latch 76. The latch 76 is pivotally mounted on each hand bar or hand grip 12 and 13, by means of a screw 77 to thus present a pivot axis at 78. It will also be seen and understood that the connector bent or angled end 31 extends through the lever 32, and likewise through lever 33 on the other side, and the end 31 also extends it to a slot 79 extending through the thickness of the latch 76. In one manner of operation, the lever 32 or 33 would be squeezed by the operator to pull upwardly on the rod or connector 23 or 24, and then the respective latch 76, there being one latch on each handlebar 12 and 13, can be pivoted to engage the rod end 31 in one of several positions for holding the rod 23 or 24 in a raised or elevated position. Therefore, where the rod end 31 is moved rightwardly and upwardly, as viewed in FIG. 6, the latch 76 can be rotated clockwise to have its arcuate surface 81 engage the underneath surface of the rod end 31 and thus hold the rod upwardly without any further gripping or maneuvering from the operator. This would therefore position the implement in the parking brake mode, since the rod 23 or 24 would have been pulled upwardly, and held in that upward position, while the brake band 47 has been tightened on the brake drum 44, for instance. This therefore provides for a self-locking parking brake once the brake is positioned in the braking mode, and the implement can then be left unattended with the brake engaged. It will therefore be noticed that the latch arcuate surface 81 is eccentric relative to the pivot axis 78, and thus the self-locking function is achieved. Also, because of the length and eccentricity of the surface 81 which defines a portion of the latch slot 79, the arrangement is such that the degree of braking force, and the ease of achieving the locked position, are readily possible. Still further, the eccentric feature for the surface 81 provides for automatic adjustment of wear and relationship of parts and the like for the brake system. That is, the brake can be engaged at any location of the surface 81 underneath the rod ends 31, and that location will automatically adjust itself for wear and relationship of parts in the system.

Next, as shown in the FIG. 6 position, when the end 31 is at the lower end of the surface 81, the end 31 is in a notch 82 and is held upwardly by virtue of the notch 82 which is again part of the slot 79. That position is a neutral position where neither the brake is applied nor is the power being transmitted to the drive wheels because the idler pulley 58 is being held upwardly off the drive belt 43.

Finally, when the lever 33 is squeezed to release the end 31 from the notch 82, then the latch 76 can be pivoted counter-clockwise about its axis 78 and to then permit the end 31 to be in the semi-circular end 83 of the notch 79. In that position, the brake is in the disengaged position, but the idler pulley 58 is moved downwardly to where it is in the drive position relative to the drive belt 43.

The latch 76 has a lateral extension 84 which can serve as a thumb pad for the operator to pivot the latch 76 by use of his thumb only, and it also has an extended arm 86 which is available for the operator to use as leverage for pivoting the latch 76 about its pivot axis 78, and that would be particularly useful when it is desired to put the latch 76 in the firm position of the parking brake lock described herein, that is when the latch 76 is rotated in the clockwise direction about its axis 78.

In this arrangement, the implement can be placed in the parked mode with the parking brake applied and retained by itself. Also, there is no need for any additional latch, lever, or like member for purposes of positioning the idler 58 and the brake band 47, but only the latch 76 is required for establishing the control to the power drive and to the brake engagement. Of course it will be seen that the drive and brake engagement are combined in actuation in that they are both responsive to the pivoted position of the plate 61. FIGS. 3 and 4 show that the plate 61 has an end 87 which has an opening 88 for receiving the swivel 89 which in turn connects with a rod 91 having its lower end connected with the brake link 54. Therefore, pivotal action of the plate 61, causing its end 87 to rise, will pull upwardly on the rod 91 and also on the link 54 and the assembly 53 and 56 to thereby tighten the brake band 47 on the drum 44, seen in FIG. 2, in the braking action. Of course it is then that the latch 76 can be positioned in any one of the three positions mentioned, namely, the running, free-wheeling, and parking brake positions, as seen in FIG. 6, such that if it is desired to position the latch 76 in the parking brake lock mode, then the latch surface 81 would engage underneath the connector end 31 to hold the entire mechanism upwardly and in the engaged brake position. FIG. 4 also shows that the rods 24 and 91 are threaded and thus adjustable in their effective lengths for the respective connections mentioned and thus the system can be set in adjusted positions to accommodate the transmission of drive power and braking engagement, as well as the disengagements.

In this arrangement, the members 26 and 27 of the prior art are not required, but the present invention contributes the additional feature of providing the parking brake lock described herein.

What is claimed is:

1. A parking brake lock for a ground-mobile implement, comprising a ground wheel, a movable brake operatively associated with said ground wheel, a handle for guiding the implement through operative association with said wheel, a connector operatively connected with said brake for moving said brake into and out of braking position and having a connector end remote from said brake, and a parking lock-lever movably mounted on a pivot axis on said handle and operatively associated with said connector end for moving said connector into said braking position, said lock-lever and said connector end being interconnected in said braking position for releasably retaining said connector in said braking position and said lock-lever including a slot with an arcuate length relative to said pivot axis and terminating in two oppositely disposed ends, and with one of said oppositely disposed ends being closer to said pivot axis than is the other of said oppositely disposed ends to thereby present a cam surface to said connector end when said brake is in said braking position.

2. The parking brake lock for a ground-mobile implement as claimed in claim 1, including an actuator movably mounted on said handle and operatively connected with said connector for selective movement of said connector to said braking relationship position and in addition to said movement of said connector as induced by said pivotal movement of said lock-lever.

3. The parking brake lock for a ground-mobile implement as claimed in claim 2, wherein said connector end is adjacent said handle, and said actuator and said parking lock-lever both engage said connector at said end of said connector.

4. The parking brake lock for a ground-mobile implement as claimed in claim 1, wherein said slot includes an offset length contained within said other of said oppositely disposed ends for receiving said connector end in a non-braking position of said connector.

5. The parking brake lock for a ground-mobile implement as claimed in claim 1, wherein said slot is shaped to include a notch for receiving said connector end to thereby secure said connector in a neutral position of both a non-braking mode and a non-driving mode.

6. The parking brake lock for a ground-mobile implement as claimed in claim 1, and wherein said slot is shaped to include an end for receiving said connector end to thereby position said connector in a position of both a non-braking mode and a driving mode.

7. The parking brake lock for a ground-mobile implement as claimed in claim 1, wherein said slot is shaped to include a notch for receiving said connector end to thereby secure said connector in a neutral position of both a non-braking mode and a non-driving mode, and wherein said slot is shaped to include an end for receiving said connector end to thereby position said connector in a position of both a non-braking mode and a driving mode.

8. In a parking brake lock for a ground-mobile implement which has a ground wheel, a movably mounted brake member operatively associated with said wheel for restraining rotation of said wheel, said brake member being spring-urged toward a dissociated position relative to said wheel for non-braking relationship, a movable connector operatively connected with said brake member for selectively and releasably moving said brake member into and out of braking relationship with said wheel in respective first and second positions of movement of said connector, and a handle affixed relative to said connector for manual guiding of the implement on the ground, the improvement comprising a parking brake lock-lever pivotally mounted on a pivot axis on said handle and being operatively connected with said connector, said parking brake lock-lever being movable to a releasable lock position of displacement of said connector against the spring-urged force of said brake member and to said first position of said connector, and said parking brake lock-lever having a surface in contact with said connector in said lock position and thereby releasably retaining said connector in said braking relationship, said lock-lever having a slot therein presenting said surface, and said connector having an end extending into said slot for movement of said connector in accord with pivotal movement of said slot, said slot including an arcuate length relative to said pivot axis and terminating in two oppositely disposed ends, and with one of said oppositely disposed ends being closer to said pivot axis than is the other of said oppositely disposed ends to thereby present a cam surface to said connector end in said braking relationship.

9. The parking brake lock for a ground-mobile implement as claimed in claim 8, including an actuator movably mounted on said handle and operatively connected with said connector for selective movement of said connector to said braking relationship position and in addition to said movement of said connector as induced by said pivotal movement of said lock-lever.

10. The parking brake lock for a ground-mobile implement as claimed in claim 9, wherein said connector has an end adjacent said handle, and said actuator and said parking brake lock-lever both engage said connector at said end of said connector.

11. The parking brake lock for a ground-mobile implement as claimed in claim 8, wherein said slot includes an offset length contained within said other of said oppositely disposed ends for receiving said connector end in said second position of said connector.

12. In a parking brake lock for a ground-mobile implement which has a ground wheel, a movably mounted brake member operatively associated with said wheel for restraining rotation of said wheel, said brake member being spring-urged toward a dissociated position relative to said wheel for non-braking relationship, a movable connector operatively connected with said brake member and being movable along an upright plane for selectively and releasably moving said brake member into and out of braking relationship with said wheel in respective first, second and third positions of said connector, a handle affixed relative to said connector for manual guiding of the implement on the ground, a lever movably mounted on said handle and being operatively connected with said connector and being movable for displacement of said connector against the spring-urged force of said brake member and to the three said positions of said connector, a pin interconnected with said connector and said lever and extending transverse to said plane of movement of said connector, a pin interconnected with said connector and said lever and extending transverse to said plane of movement of said connector, the improvement comprising a lock-lever pivotally mounted on a pivot axis on said handle and having three surfaces for respective contact with said connector in the three said positions and thereby releasably retaining said connector in said three positions, said three surfaces being disposed sequentially along said lock-lever and with each of said surfaces extending underneath said pin for upward support of said connector in each of said three positions, said lock-lever has a slot therein presenting each of said three surfaces, said pin extends into said slot for movement of said connector in accord with pivotal movement of said slot, and said slot includes an arcuate length relative to said pivot axis and terminating in two oppositely disposed ends, and with one of said oppositely disposed ends being closer to said pivot axis than is the other of said oppositely disposed ends to thereby present a cam surface to said pin in the third said braking position.

13. In a parking brake lock for a ground-mobile implement which has a ground wheel, a movable mounted brake member operatively associated with said wheel for restraining rotation of said wheel, said brake member being spring-urged downwardly toward a dissociated position relative to said wheel for non-braking relationship, a movable connector operatively connected with said brake member and being yieldingly urged by said spring urging of said brake member and being movable along an upright plane for selectively and releasably moving said brake member into and out of braking relationship with said wheel in respective first, second and third positions of said connector, a handle affixed relative to said connector for manual guiding of the implement on the ground, a lever movable mounted on said handle and being operatively connected with said connector and being movable for upward displacement of said connector against the spring-urged force of said brake member and to the three said positions of said connector, a pin included with said connector and extending transverse to said upright plane of movement of said connector, the improvement comprising a lock-lever pivotally mounted on said handle and having an uprightly oriented slot therein defined in its lower edge by three upwardly facing surfaces for respective contact with said pin in the respective three said positions and thereby respectively releasably retain said connector in said three positions, said three surfaces being disposed sequentially along said lock-lever and with each of said surfaces respectively extending underneath said pin in contact therewith and sequentially urging said pin in upward support against the spring urging of said brake member for upward support of said connector in each of said three positions, and with said third position of upward support being a parking brake releasable locking position, wherein said lock lever includes a thumb-engageable pad upon which the operator can press to pivot said lever, and said lever includes an extension having a length sufficient for applying a pivoting force to said lever beyond the pivoting of said lever via said thumb pad to thereby effect the upward urging of said pin against the spring urging of siad brake member.

* * * * *